W. M. MUCHOW.
MEANS FOR PREPARING AMALGAM FOR DENTISTS' USE.
APPLICATION FILED MAY 12, 1919.
1,356,731. Patented Oct. 26, 1920.
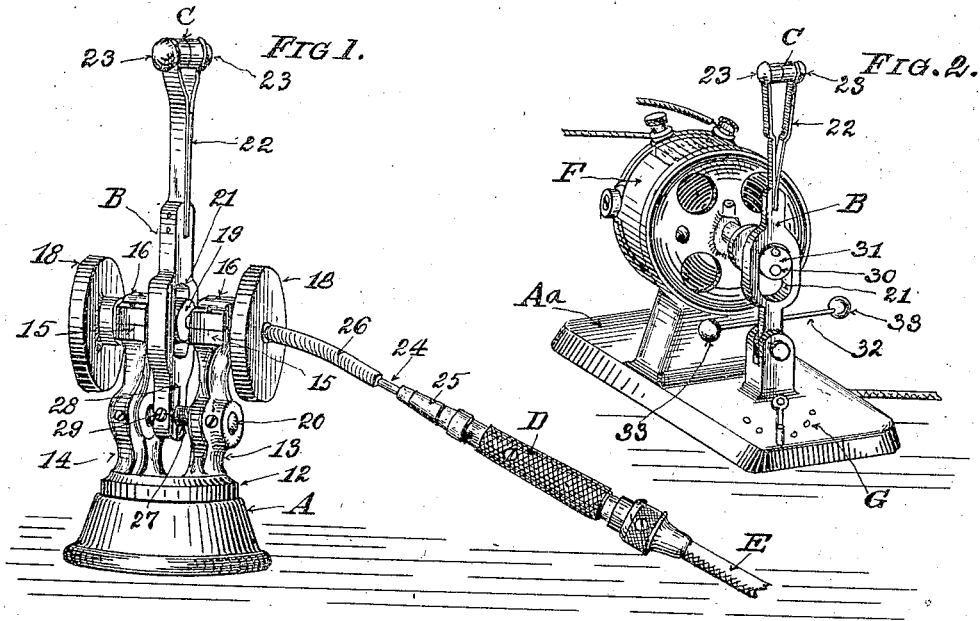
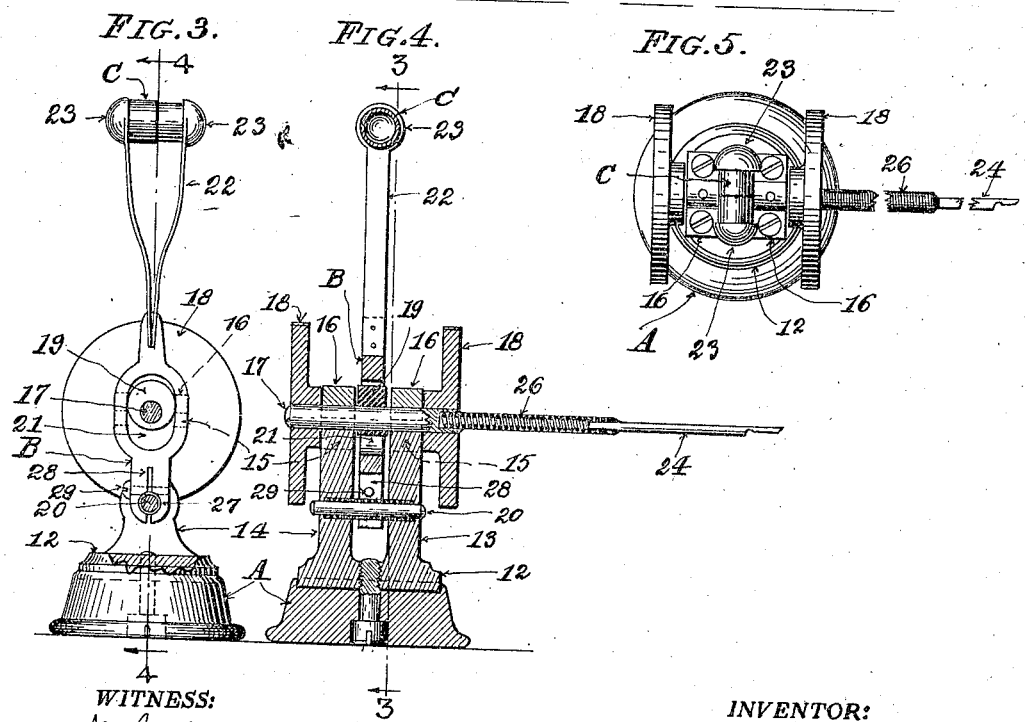
WITNESS:
Al. Stark
INVENTOR:
WILLIAM M. MUCHOW,
BY Michael J. Stark & Sons
ATTORNEYS.

UNITED STATES PATENT OFFICE.

WILLIAM M. MUCHOW, OF EVANSTON, ILLINOIS.

MEANS FOR PREPARING AMALGAM FOR DENTISTS' USE.

1,356,731.         Specification of Letters Patent.      Patented Oct. 26, 1920.

Application filed May 12, 1919. Serial No. 296,518.

*To all whom it may concern:*

Be it known that I, WILLIAM M. MUCHOW, a citizen of the United States, and a resident of the city of Evanston, in the county of Cook and State of Illinois, have invented a certain new and useful Improvement in Means for Preparing Amalgam for Dentists' Use; and I do hereby declare that the following description of my said invention, taken in connection with the accompanying sheet of drawings, forms a full, clear, and exact specification, which will enable others skilled in the art to which it appertains to make and use the same.

My invention relates generally to improvements in means for preparing amalgam for dentists' use; and it consists, essentially, in the novel and peculiar combination of parts and details of construction, as hereinafter first fully set forth and described and then pointed out in the claims.

The object of this invention is the production of efficient and highly effective means for preparing amalgam for use by dentists in filling cavities in human teeth.

It is desirable that the amalgam used by dentists be prepared shortly before being used, owing to the fact that the amalgam hardens very rapidly. Dentists are now generally mixing the metals for producing the amalgam by kneading the same in the palm of the hand, an operation which is highly objectionable, unsanitary, poisonous, and troublesome. In order to overcome these objectionable features, I produce this amalgam by placing the proper amount of mercury, and a proportionate amount of the alloy into a small vessel, preferably closable, and then rapidly and violently shaking the vessel by hand, whereby the amalgam is readily and rapidly formed. While it is possible to produce the amalgam as stated, I prefer to do the mixing and agitation of the composition mechanically; and in the drawings forming a part of this specification, I illustrate several mechanical devices by which the preparation of the amalgam is automatically performed, whereby the time heretofore consumed by the dentist in preparing the amalgam is considerably lessened, and the patient's occupation of a dentist's chair materially reduced.

In the drawings—

Figure 1 is a perspective view of an apparatus embodying my invention. Fig. 2 is a like view of a modified form of an apparatus suitable for practising my invention. Fig. 3 is a sectional view on line 3—3 of Fig. 4, of the apparatus illustrated in Fig. 1. Fig. 4 is a transverse sectional elevation on line 4—4 of Fig. 3; and Fig. 5 is a plan of the same.

Like parts are designated by the same characters and symbols of reference in all the figures.

A, in the drawings designates the base of this apparatus.

As shown in Figs. 1, 3, 4, and 5, this base is, preferably, a wooden structure; and upon this base there is mounted a frame for the apparatus, which frame comprises a plate 12, upon which there are erected two standards 13, 14, in spaced apart relationship, the upper ends of which terminate in journal bearings 15, having removable caps 16. In these journal bearings there is rotatably mounted a shaft 17, at the outer ends of which there are secured annular disks 18, serving as balance, or fly wheels. Medially upon this shaft, between the bearings 15, there is fixed an eccentric 19, to be hereinafter again referred to.

Below the shaft 7 there is fixed in the standards 13, 14, an axle 20, and upon this axle there is oscillatably mounted a pendulum lever B. This lever has medially an oblong aperture 21, in which the eccentric 19 is constructed to operate. The upper terminal of this pendulum lever B is slotted, and in this slot there are secured two blade springs 22, the upper ends of which are formed into cups 23, to receive between them a container C, which container is, preferably, a so-called capsule, which consists of two separable parts telescoping one into the other. This capsule is, preferably, made of gelatin or celluloid, which substances are not affected by mercury, which, together with the alloy or metals to be amalgamed, are placed in the capsule when the amalgam is to be prepared.

The shaft 17 is rotated by any suitable mechanism or motor, and when thus rotated, it will vibrate the pendulum lever rather rapidly, and this rapid vibration, and the violent shaking of the metals contained in the capsule will very soon effect the amalgamation of said metals.

Various means can be employed for rotating the shaft 17; but since a dentist's operating room is always provided with a dental engine, driven either by foot power or a prime mover to operate the dental hand piece D, I prefer to employ this latter instrument to rotate the shaft 17; and in order to connect this hand piece to the shaft 17, I form on said shaft an extension 24, which is engaged by the chuck 25 of the hand piece D, which chuck is rotated by the usual flexible shaft E, that connects the hand piece to the dental engine, not shown.

The device hereinbefore described is rather small, so that it can be readily held in one hand when operating; and in order that it may be held in almost any position, I connect the extension 24 to the shaft 17 by a short flexible shaft 26.

A device of the nature described is required to be as noiseless as it is possible to make the same, and to attain this object, I form the eccentric 19 of a comparatively soft material, such as fiber, leather, rawhide, and the like. I also surround the axle 20 with a closely-wound coil spring 27, and clamp the lower end of the pendulum lever B to this spring by splitting the lower end of the lever B, as at 28, Figs. 1, 3, and 4, and drawing the two parts together by a screw 29. This lever B will thus oscillate with the coil spring 27, which experience has demonstrated makes the operation of the apparatus practically noiseless.

As already stated, this entire apparatus is quite small, so that it can be conveniently held in one hand, it weighing, as a matter of fact less than two pounds. It can be kept in a dentist's operating room ready for immediate use, and being quite noiseless, it will not irritate nervous patients in a dentist's reception room. In fact patients in the chair are generally pleased to see the device operating.

In Fig. 2 I have shown an apparatus slightly modified in construction, it being an electric motor which rotates the eccentric shaft directly from the motor shaft. Thus F, in this figure indicates a small electric motor upon the shaft 30 of which the eccentric 31 is mounted. The pendulum lever B in this instance is precisely the same as hereinbefore described and holds the capsule C in the same manner. The base A$^a$, in this instance, however, is larger than the base A, in order to accommodate the electric motor F, and to receive a rheostat G in the base, by which the speed of the motor is controlled.

This latter apparatus is more specially adapted for mixing large quantities of the composition; but I have found that when rapidly operating, the momentum of the vibrating pendulum lever causes the whole apparatus to shake and rock. This objection I have overcome by providing the machine with a balancing device which acts somewhat similar to the balance wheels 18 hereinbefore mentioned, which balancing device consists of a rod 32, secured to the lower part of the pendulum lever, and carrying at its ends counterweights 33.

In an application for patent filed by me on the 22d day of March, 1918, Serial No. 224,089, for a method of preparing amalgam for dental use, I have shown and described various apparatus for preparing this amalgam, all of which have as their controlling feature of novelty the capsule container and means for rapidly and violently shaking the capsule to cause the amalgamation of the metals in the container, and all of which accomplish the object in view more or less satisfactorily. I prefer, however, the two types of machines hereinbefore described, because they are less bulky, more silent, and more pleasing to the eye.

While I have hereinbefore described the preferred embodiment of my invention, and a modification thereof, I desire it to be understood that I am aware that other changes may be made in the details of construction and that parts may be omitted without departing from the scope of my invention as defined in the subjoined claims.

Having thus fully described this invention, I claim as new, and desire to secure to myself by Letters Patent of the United States—

1. In a device of the class described, the combination of a base, an arm pivoted to said base, and an eccentric for oscillating said arm, said arm terminating in a pair of fingers arranged in line with the plane of oscillation, said fingers having oppositely facing sockets and being composed of spring metal to provide means for receiving a container therebetween, substantially as described.

2. In a device of the character described, the combination of a support, a pendulum pivoted on said support, means for rapidly oscillating said pendulum in a limited arc, spring fingers mounted on said pendulum, the fingers being mounted in parallelism with the plane of oscillation and each finger being provided with a socket at its end, the sockets facing each other, and a telescopic container adapted to be received and held by engagement of its ends with said sockets, substantially as described.

In testimony that I claim the foregoing as my invention, I have hereunto set my hand.

WILLIAM M. MUCHOW.